(12) United States Patent
Volmerding et al.

(10) Patent No.: US 12,151,668 B2
(45) Date of Patent: Nov. 26, 2024

(54) SYSTEMS AND METHODS FOR CONTROLLING OPERATION OF HYBRID VEHICLES

(71) Applicant: Cummins Emission Solutions Inc., Columbus, IN (US)

(72) Inventors: Matthew K. Volmerding, Columbus, IN (US); Lu Qiu, Columbus, IN (US); Lars Krister Henrichsen, Columbus, IN (US); Ying Yuan, Rexford, NY (US); Jinyong Luo, Columbus, IN (US); Manik Narula, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 279 days.

(21) Appl. No.: 17/771,852

(22) PCT Filed: Aug. 31, 2020

(86) PCT No.: PCT/US2020/048770
§ 371 (c)(1),
(2) Date: Apr. 26, 2022

(87) PCT Pub. No.: WO2021/086490
PCT Pub. Date: May 6, 2021

(65) Prior Publication Data
US 2022/0371575 A1      Nov. 24, 2022

Related U.S. Application Data

(60) Provisional application No. 62/927,406, filed on Oct. 29, 2019.

(51) Int. Cl.
*B60W 20/15*     (2016.01)
*F01N 3/10*      (2006.01)
(Continued)

(52) U.S. Cl.
CPC .............. *B60W 20/15* (2016.01); *F01N 3/106* (2013.01); *F01N 3/208* (2013.01); *F02D 41/024* (2013.01);
(Continued)

(58) Field of Classification Search
None
See application file for complete search history.

(56) References Cited

U.S. PATENT DOCUMENTS 5,613,360 A   3/1997  Iwai et al.
6,057,605 A   5/2000  Bourne et al.
(Continued)

FOREIGN PATENT DOCUMENTS

DE   10 2014 200 077 A1   7/2014
GB        2503725 A       1/2014

OTHER PUBLICATIONS

Micu, Dan et al., "Direct measurements using on-board diagnostics: study of the dynamics of a vehicle equipped with a DSG automated transmission", Jan. 2018, MATEC Web of Conferences (Year: 2018).*

(Continued)

*Primary Examiner* — Todd Melton
*Assistant Examiner* — Sarah A. Mueller
(74) *Attorney, Agent, or Firm* — Foley & Lardner LLP (57) ABSTRACT

A hybrid vehicle comprises an engine, an energy storage device, and an aftertreatment system comprising a SCR catalyst configured to treat constituents of an exhaust gas. A controller is operatively coupled to the engine, the energy storage device, and the after treatment system, and configured to estimate an exhaust gas temperature and flow rate of the exhaust gas based on a set of engine operating parameters. The controller determines an exhaust gas cooling rate based on the exhaust gas temperature, flow rate, and a SCR (Continued)

catalyst temperature, and an ambient cooling rate based on an ambient temperature, a vehicle speed and the catalyst temperature. The controller determines a SCR catalyst temperature change rate based on the exhaust gas and ambient cooling rates, and adjusts a load distribution between the engine and the energy storage device based on the SCR catalyst temperature change rate.

20 Claims, 4 Drawing Sheets

(51) Int. Cl.
*F01N 3/20* (2006.01)
*F02D 41/02* (2006.01)

(52) U.S. Cl.
CPC . *B60W 2510/068* (2013.01); *B60W 2510/244* (2013.01); *B60W 2520/10* (2013.01); *B60W 2530/209* (2020.02); *B60W 2710/0644* (2013.01); *B60W 2710/0666* (2013.01); *B60W 2710/0688* (2013.01); *F02D 2200/0802* (2013.01)

(56) References Cited

U.S. PATENT DOCUMENTS

| | | | |
|---|---|---|---|
| 8,073,610 B2 | 12/2011 | Heap et al. | |
| 9,180,870 B2 | 11/2015 | Whitney et al. | |
| 2010/0268438 A1 | 10/2010 | Hiranuma et al. | |
| 2012/0173062 A1* | 7/2012 | Madurai Kumar | ... B60W 20/13 903/903 |
| 2012/0204629 A1* | 8/2012 | Sata | .... F02D 41/1454 73/114.75 |
| 2014/0013726 A1* | 1/2014 | Yacoub | ..... F01N 3/32 60/274 |
| 2018/0142601 A1 | 5/2018 | Kumar et al. | |
| 2018/0283248 A1* | 10/2018 | Upadhyay | ........... F02D 41/1446 |
| 2020/0248607 A1* | 8/2020 | Joo | ......... F01N 3/021 |

OTHER PUBLICATIONS

International Search Report and Written Opinion issued in PCT Application No. PCT/US2020/048770, issued Nov. 24, 2020, 9 pages.

* cited by examiner

SYSTEMS AND METHODS FOR CONTROLLING OPERATION OF HYBRID VEHICLES

CROSS-REFERENCE TO RELATED APPLICATIONS

The present application is a National Phase of PCT Application No. PCT/US2020/048770, filed Aug. 31, 2020, which claims the benefit of U.S. Provisional Application No. 62/927,406, filed Oct. 29, 2019. The contents of these applications are incorporated by reference in their entireties.

TECHNICAL FIELD

The present disclosure relates generally to hybrid vehicles including aftertreatment systems and methods to control temperature of such aftertreatment systems.

BACKGROUND

Hybrid vehicles include an internal combustion engine and energy storage device such as a battery, and distributes load between the engine and battery to optimize fuel economy. Hybrid vehicles also include exhaust aftertreatment systems that receive and treat exhaust gas generated by the internal combustion engine. Generally, exhaust gas aftertreatment systems comprise any of several different components to reduce the levels of harmful exhaust emissions present in exhaust gas. For example, certain exhaust gas aftertreatment systems include a selective catalytic reduction (SCR) catalyst for decomposing constituents of the exhaust gas such as nitric oxides ($NO_x$) gases include in the exhaust gas. A catalytic conversion efficiency of SCR catalysts is dependent on the SCR catalyst temperature. When the load on the engine is low, the SCR catalyst can cool which results in a decrease in the catalytic conversion efficiency of the SCR catalyst.

SUMMARY

Embodiments described herein relate generally to systems and methods for controlling temperature of aftertreatment systems included in hybrid vehicles, and in particular, to systems and methods that control a load distribution between an engine and an energy storage device of the hybrid vehicle to control a temperature of the exhaust gas and thereby, a SCR catalyst included in the aftertreatment system.

In some embodiments, a controller for controlling an operation of a hybrid vehicle that includes an engine, an aftertreatment system comprising a selective catalytic reduction (SCR) catalyst coupled to the engine, and an energy storage device, is configured to be operatively coupled to the engine, the energy storage device, and the aftertreatment system, the controller configured to: estimate an exhaust gas temperature and an exhaust gas flow rate of an exhaust gas received by the aftertreatment system from the engine based on a set of engine operating parameters, estimate an exhaust gas cooling rate of the SCR catalyst based on the estimated exhaust gas temperature and the exhaust gas flow rate, and a SCR catalyst temperature, determine an ambient cooling rate of the SCR catalyst based on an ambient temperature of an environment external to the aftertreatment system, a vehicle speed of the hybrid vehicle, and the SCR catalyst temperature, estimate a SCR catalyst temperature change rate based on the exhaust gas cooling rate and the ambient cooling rate, and adjust a load distribution between the engine and the energy storage device based on the SCR temperature change rate.

In some embodiments, the controller is further configured to: in response to determining based on the SCR catalyst temperature change rate that the SCR catalyst temperature is decreasing towards a low temperature threshold, adjust the load distribution so as to increase a load on the engine. In some embodiments, the controller is further configured to: in response to determining based on the SCR catalyst temperature change rate that the SCR catalyst temperature is increasing towards a high temperature threshold, adjust the load distribution so as to decrease load on the engine.

In some embodiments, the controller is further configured to: in response to determining that an increase in the SCR catalyst temperature change rate is greater than a rate increase threshold, increase a load on the energy storage device relative to the engine so as to reduce the SCR catalyst temperature change rate.

In some embodiments, the set of engine parameters comprise a speed of the engine, a torque demand from the engine, and a coolant temperature of a coolant flowing through the engine.

In some embodiments, the aftertreatment system also comprises an oxidation catalyst disposed upstream of the SCR catalyst, and the controller is configured to estimate the exhaust gas cooling rate based also on an oxidation catalyst temperature of the oxidation catalyst.

In some embodiments, the controller is further configured to instruct a reductant insertion assembly to adjust an amount of reductant inserted into the aftertreatment system. In some embodiments, the controller is further configured to: in response to determining that the SCR catalyst temperature is within an optimal operational range, adjust the load distribution based on a load demand, a desired fuel economy, an amount of fuel remaining, and/or an amount of power remaining in the energy storage device.

In some embodiments, a hybrid vehicle comprises: an engine; an energy storage device; an aftertreatment system fluidly coupled to the engine and configured to receive an exhaust gas generated by the engine, the aftertreatment system comprising a selective catalytic reduction (SCR) catalyst configured to treat constituents of the exhaust gas; and a controller operatively coupled to the engine, the energy storage device, and the aftertreatment system, the controller configured to: estimate an exhaust gas temperature and an exhaust gas flow rate of the exhaust gas based on a set of engine operating parameters, estimate an exhaust gas cooling rate of the exhaust gas based on the exhaust gas temperature, the exhaust gas flow rate, and a SCR catalyst temperature, determine an ambient cooling rate of the SCR catalyst based on an ambient temperature of an environment external to the aftertreatment system, a vehicle speed of the hybrid vehicle, and the SCR catalyst temperature, estimate a SCR catalyst temperature change rate based on the exhaust gas cooling rate and the ambient cooling rate, and adjust a load distribution between the engine and the energy storage device based on the SCR catalyst temperature change rate.

In some embodiments, the controller is configured to: in response to determining based on the SCR catalyst temperature change rate that the SCR catalyst temperature is decreasing towards a low temperature threshold, adjust the load distribution so as to increase a load on the engine. In some embodiments, the controller is configured to: in response to determining based on the SCR catalyst temperature change rate that the SCR catalyst temperature is increasing towards a high temperature threshold, adjust the load distribution so as to decrease load on the engine.

In some embodiments, the controller is configured to: in response to determining that an increase in the SCR catalyst temperature change rate is greater than a rate increase threshold, increase a load on the energy storage device relative to the engine so as to reduce the SCR catalyst temperature change rate.

In some embodiments, the set of engine parameters comprise a speed of the engine, a torque demand from the engine, and a coolant temperature of a coolant flowing through the engine.

In some embodiments, the aftertreatment system also comprises an oxidation catalyst disposed upstream of the SCR catalyst, and the controller is configured to estimate the exhaust gas cooling rate based also on an oxidation catalyst temperature of the oxidation catalyst.

In some embodiments, the aftertreatment system includes a reductant insertion assembly configured to insert a reductant into the aftertreatment system; and the controller is further configured to: instruct a reductant insertion assembly to adjust an amount of reductant inserted into the aftertreatment system.

In some embodiments, the controller is further configured to: in response to determining that the SCR catalyst temperature is within an optimal operational range, adjust the load distribution based on a load demand, a desired fuel economy, an amount of fuel remaining, and/or an amount of power remaining in the energy storage device.

In some embodiments, a method for controlling operation of a hybrid vehicle that includes an engine, an aftertreatment system comprising a selective catalytic reduction (SCR) catalyst coupled to the engine, and an energy storage device, comprises: estimating, by a controller of the hybrid vehicle, an exhaust gas temperature and an exhaust gas flow rate of an exhaust gas received by the aftertreatment system from the engine based on a set of engine operating parameters; estimating, by the controller, an exhaust gas cooling rate of the SCR catalyst based on the estimated exhaust gas temperature, the exhaust gas flow rate, and a SCR catalyst temperature; determining, by the controller, an ambient cooling rate of the SCR catalyst based on an ambient temperature of an environment external to the aftertreatment system, a vehicle speed of the hybrid vehicle, and the SCR catalyst temperature; estimating, by the controller, a SCR catalyst temperature change rate based on the exhaust gas cooling rate and the ambient cooling rate; and adjusting, by the controller, a load distribution between the engine and the energy storage device based on the SCR temperature change rate.

In some embodiments, the method further comprises: in response to determining, by the controller, based on the SCR catalyst temperature change rate that the SCR catalyst temperature is decreasing towards a low temperature threshold, adjusting, by the controller, the load distribution so as to increase a load on the engine. In some embodiments, the method comprises: in response to determining, by the controller, based on the SCR catalyst temperature change rate that the SCR catalyst temperature is increasing towards a high temperature threshold, adjusting, by the controller, the load distribution so as to decrease load on the engine.

In some embodiments, a controller for controlling an operation of a hybrid vehicle that includes an engine, an aftertreatment system comprising a selective catalytic reduction (SCR) catalyst coupled to the engine, and an energy storage device, the controller being configured to be operatively coupled to the engine, the energy storage device, and the aftertreatment system, is configured to: estimate an exhaust gas cooling rate of the SCR catalyst; determine or estimate an ambient cooling rate of the SCR catalyst; estimate a SCR catalyst temperature change rate based on the exhaust gas cooling rate and the ambient cooling rate; and adjust a load distribution between the engine and the energy storage device based on the SCR temperature change rate.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing in this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for controlling temperature of aftertreatment systems included in hybrid vehicles, and in particular, to systems and methods that control a load distribution between an engine and an energy storage device of the hybrid vehicle to control a temperature of the exhaust gas and thereby, a SCR catalyst included in the aftertreatment system.

Hybrid vehicle systems are expected to become increasingly more prevalent with increasingly stringent $CO_2$ and greenhouse gas regulatory requirements. Hybrid vehicles include an engine and an energy storage device, and distribute load between the engine and the energy storage device to optimize fuel efficiency thereof. Such hybrid vehicle systems include an aftertreatment system that may include a SCR catalyst configured to treat constituents of an exhaust gas produced by the engine.

A catalytic conversion efficiency of the SCR catalyst depends on the operating temperature of the SCR catalyst, which is generally based on the temperature of the exhaust gas flowing therethrough. For example, SCR catalyst generally have a sufficient catalytic conversion efficiency at a SCR catalyst temperature of greater than 200 degrees Celsius, to provide reduction in $NO_x$ gases to meet stringent $NO_x$ emission standards. The catalytic conversion efficiency of SCR catalysts may however, start decreasing at substantially high temperatures (e.g., temperatures greater than 400 degrees Celsius).

Typically, duty cycles of engines in hybrid vehicles have a significant amount of transient operation thus causing the aftertreatment to continually go through periods of warmup and cool down. During light load duty cycles, a SCR catalyst temperature of the SCR catalyst decreases due to hybrid vehicle drawing load mainly from the energy storage device thereof to maximize fuel economy. In such situations (e.g., when idling or when there are no transients), there is low load, no load, or negative load (e.g., during motoring) on the engine, and the SCR catalyst temperature may drop below the optimal operational temperature range (e.g., between 200 degrees Celsius and 400 degrees Celsius) of the SCR catalyst. This leads to a drop in catalytic conversion efficiency of the SCR catalyst and an increase in an amount of exhaust gases emitted by the aftertreatment system. Similarly, during high engine load conditions, the exhaust gas temperature and thereby, the SCR catalyst temperature may increase above the optimal operation temperature, which may also result in a decrease in a catalytic conversion efficiency of the SCR catalyst.

Furthermore, emissions of $NO_x$ gases from the aftertreatment system may also change depending upon an operational condition of the hybrid vehicle. For example, some hybrid vehicles may be used for drayage of load to a port or delivery center. To reach the destination, the hybrid vehicle may drive on a metro highway, local roads, on small roads leading to the dock, move slowly or creep while standing in a queue at the dock, and follow the same path back. If a purely engine run vehicle is performing the drayage, an amount of $NO_x$ gases emitted by the aftertreatment system varies based on the portion of location and operating conditions of the vehicle. For example, about 19% of the total $NO_x$ emissions of such a vehicle during the entire trip may be emitted on the metro highway, about 20% may be emitted on the local highway, about 28% may be emitted at the port near dock, and about 24% may be emitted while creeping in the queue.

In contrast, various embodiments of the systems and methods described herein for controlling operations of a hybrid vehicle may provide one or more benefits including, for example: (1) suppressing decrease of a SCR catalyst temperature such that the SCR catalyst temperature remains greater than a low temperature threshold so as to suppress drop in catalytic conversion efficiency of the SCR system; (2) suppressing increase in the SCR catalyst temperature such that the SCR catalyst temperature remains less than a high level threshold to also suppress reduction in catalytic conversion efficiency at high temperatures; (3) slowing thermal ramp of the SCR catalyst when transitioning from a light load to a mid/high load to reduce thermal stress and damage to the SCR catalyst; (4) reducing release of ammonia from SCR catalyst at high temperatures thereby, reducing ammonia slip; (5) maintaining a catalytic conversion efficiency of the SCR catalyst while still providing a high fuel economy; and (6) distributing a load between the engine and the energy storage device based on a location of the hybrid vehicle on a route so as to reduce $NO_x$ emissions.

Figure 1:
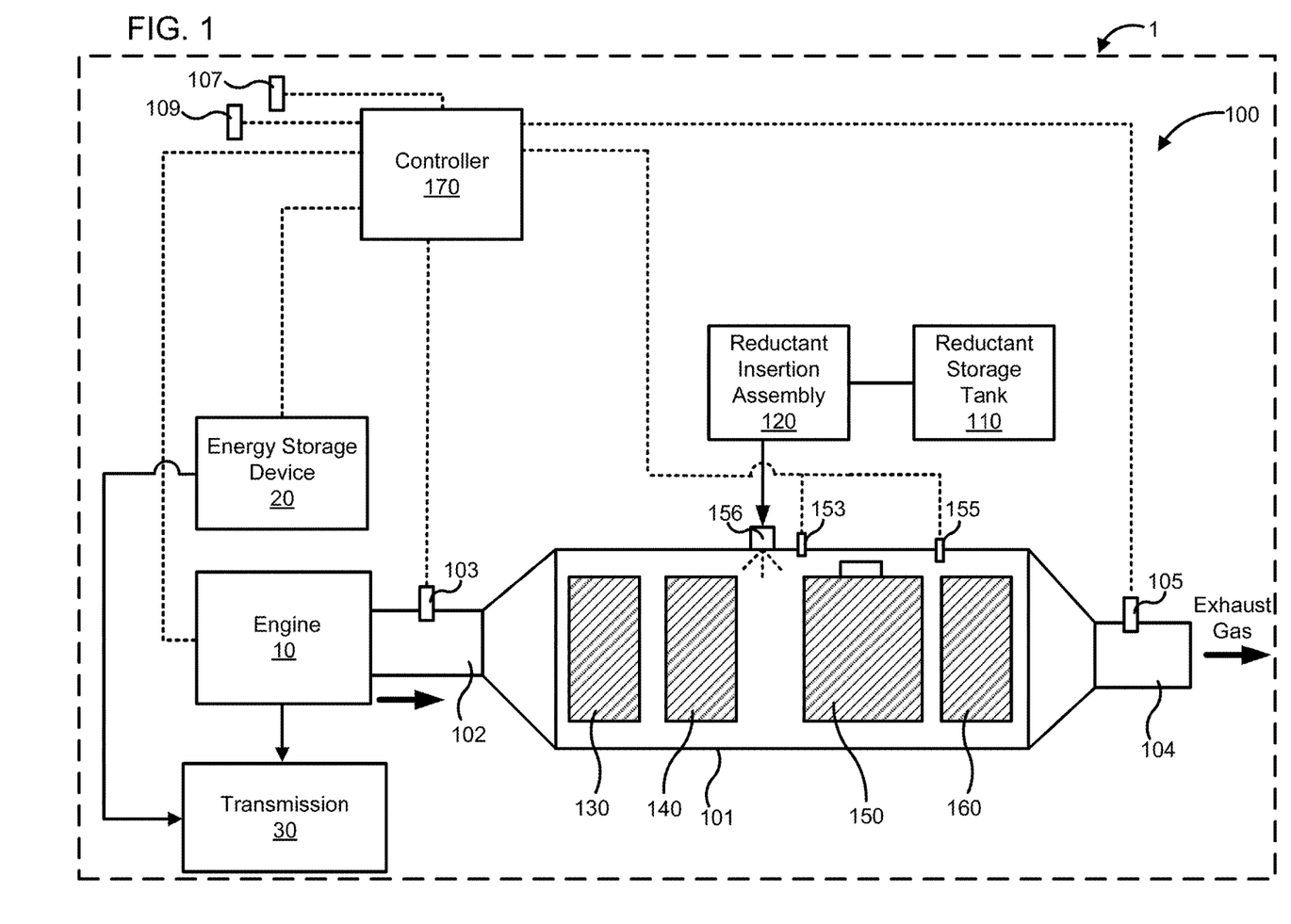
FIG. 1 is a schematic illustration of a hybrid vehicle including an aftertreatment system, according to an embodiment.

FIG. 1 is a schematic illustration of a hybrid vehicle 1, according to an embodiment. The hybrid vehicle 1 includes an engine 10, an energy storage device 20, a transmission 30, an aftertreatment system 100, and a controller 170, any may include any other components (not shown) as necessary for the operation of the vehicle 1.

The engine 10 may include, for example, a diesel engine, a gasoline engine, a natural gas engine, a dual fuel engine, a biodiesel engine, an E-85 engine, or any other suitable engine). In some embodiments, the engine 10 includes a diesel engine. The engine 10 combusts fuel and generates an exhaust gas that includes $NO_x$, $CO$, $CO_2$ and other constituents.

The energy storage device 20 may include one or more batteries (e.g., high voltage batteries, a lead-acid battery, a lithium-ion battery, etc.), one or more capacitors (e.g., super capacitors, etc.), and/or any other energy storage devices, or combination thereof. The energy storage device 20 may be structured to provide the stored electrical energy to: (i) any vehicle subsystems of the hybrid vehicle 1 to operate various electrical based components of the hybrid vehicle 1 (e.g., while the engine 10 is running, while the engine 10 is off, etc.), (ii) an electromagnetic device (not shown) that may be included in the vehicle 1 to start the engine 10 (e.g., in response to a restart command after a stop-start feature turns off the engine 10, when an operator keys on the engine 10, etc.), and/or (iii) the electromagnetic device to facilitate providing a mechanical output to the transmission 30 (e.g., to drive the vehicle 1, etc.).

The transmission 30 may be structured as any type of transmission, such as a continuous variable transmission, a manual transmission, an automatic transmission, an automatic-manual transmission, a dual clutch transmission, and so on. Accordingly, as transmissions vary from geared to continuous configurations (e.g., continuous variable transmission), the transmission 30 may include a variety of settings (gears, for a geared transmission) that affect different output speeds based on an input speed received thereby. The transmission 30 selectively receives mechanical power from the engine 10 and/or the energy storage device 20 (e.g., the electromagnetic device coupled to the energy storage device 20) to drive the hybrid vehicle 1.

The aftertreatment system 100 is coupled to the engine 10. The aftertreatment system 100 is configured to receive exhaust gas from the engine 10 and treat constituents of the exhaust gas, for example, decompose $NO_x$ gases include in the exhaust gas. The aftertreatment system 100 includes a housing 101 defining an internal volume within which a SCR catalyst 150 is disposed. In various embodiments, the aftertreatment system 100 may also include an oxidation catalyst 130, a filter 140, and an ammonia oxidation ($AMO_x$) catalyst 160 disposed within the housing 101. The housing 101 may be formed from a rigid, heat-resistant and corrosion-resistant material, for example stainless steel, iron, aluminum, metals, ceramics, or any other suitable material. The housing 101 may have any suitable cross-section, for example circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter such as soot by the filter 140 and/or reduce constituents of the exhaust gas such as $NO_x$ gases, CO, unburnt hydrocarbons, etc. included in the exhaust gas).

A first sensor 103 may be positioned in the inlet conduit 102. The first sensor 103 may comprise a $NO_x$ sensor configured to measure an amount of $NO_x$ gases included in the exhaust gas flowing into the SCR catalyst 150, and may include a physical sensor or a virtual sensor. In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second $NO_x$ sensor configured to determine an amount of NOx gases expelled into the environment after passing through the SCR catalyst 150. In other embodiments, the second sensor 105 may comprise a particulate matter sensor configured to determine an amount of particulate matter (e.g., soot included in the exhaust gas exiting the filter 140) in the exhaust gas being expelled into the environment. In still other embodiments, the second sensor 105 may comprise an ammonia sensor configured to measure an amount of ammonia in the exhaust gas flowing out of the SCR catalyst 150, i.e., determine the ammonia slip. This may be used as a measure of a catalytic conversion efficiency of the SCR catalyst 150 for adjusting an amount of reductant to be inserted into the SCR catalyst 150, and/or adjusting a temperature of the SCR catalyst 150 so as to allow the SCR catalyst 150 to effectively use the ammonia for catalytic decomposition of the $NO_x$ gases included in the exhaust gas flowing therethrough. The $AMO_x$ catalyst 160 may be positioned downstream of the SCR catalyst 150 so as to decompose any unreacted ammonia in the exhaust gas downstream of the SCR catalyst 150.

The oxidation catalyst 130 may be positioned upstream of the SCR catalyst 150 and configured to decompose unburnt hydrocarbons and/or CO included in the exhaust gas. In some embodiments, the oxidation catalyst 130 may include a diesel oxidation catalyst. The filter 140 is disposed downstream of the oxidation catalyst 130 and upstream of the SCR catalyst 150, and configured to remove particulate matter (e.g., soot, debris, inorganic particles, etc.) from the exhaust gas. In various embodiments, the filter 140 may include a ceramic filter. In some embodiments, the filter 140 may include a cordierite filter that can, for example, be an asymmetric filter. In yet other embodiments, the filter 140 may be catalyzed.

The SCR catalyst 150 is formulated to decompose constituents of an exhaust gas flowing therethrough in the presence of a reductant, as described herein. In some embodiments, the SCR catalyst 150 may include a selective catalytic reduction filter (SCRF). Any suitable SCR catalyst 150 may be used such as, for example, platinum, palladium, rhodium, cerium, iron, manganese, copper, vanadium based catalyst, any other suitable catalyst, or a combination thereof. The SCR catalyst 150 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 150. Such washcoat materials may comprise, for example, aluminum oxide, titanium dioxide, silicon dioxide, any other suitable washcoat material, or a combination thereof.

The exhaust gas (e.g., diesel exhaust gas) can flow over and/or around the SCR catalyst 150 such that any $NO_x$ gases included in the exhaust gas are further reduced to yield an exhaust gas that is substantially free of $NO_x$ gases. A SCR catalyst inlet temperature sensor 153 may be positioned upstream of the SCR catalyst 150 and configured to determine a temperature of the exhaust gas entering the SCR catalyst 150. A SCR catalyst outlet temperature sensor 155 may also be positioned proximate to an outlet of the SCR catalyst 150 and configured to measure a temperature of the exhaust gas exiting the SCR catalyst 150. The temperature of the exhaust gas measured at the inlet and outlet of the SCR catalyst 150 may be used to estimate a SCR catalyst temperature (e.g., a weighted temperature of the SCR catalyst 150). Additionally or alternatively, a temperature sensor (not shown) may also be disposed within the SCR catalyst 150 for measuring a bed temperature of the SCR catalyst 150. In other embodiments, the SCR catalyst temperature may be estimated based on an exhaust gas temperature, exhaust gas flow rate (e.g., at an inlet of the SCR catalyst 150), physical properties of the SCR catalyst 150 and/or dimensions of the SCR catalyst 150. In some embodiments, a plurality of SCR catalyst temperatures measured or estimated at various points along the length of the SCR catalyst 150 may be used.

Although FIG. 1 shows only the oxidation catalyst 130, the filter 140, the SCR catalyst 150, and the AMOK catalyst 160 positioned within the internal volume defined by the housing 101, in other embodiments, a plurality of aftertreatment components may be positioned within the internal volume defined by the housing 101 in addition to the oxidation catalyst 130, the filter 140, the SCR catalyst 150 and the AMOK catalyst 160. Such aftertreatment components may comprise, for example, mixers, baffle plates, secondary filters (e.g., a secondary partial flow or catalyzed filter) or any other suitable aftertreatment component.

A reductant port 156 may be positioned on a sidewall of the housing 101 and structured to allow insertion of a reductant therethrough into the internal volume defined by the housing 101. The reductant port 156 may be positioned upstream of the SCR catalyst 150 (e.g., to allow reductant to be inserted into the exhaust gas upstream of the SCR catalyst 150) or over the SCR catalyst 150 (e.g., to allow reductant to be inserted directly on the SCR catalyst 150). In other embodiments, the reductant port 156 may be disposed on the inlet conduit 102 and configured to insert the reductant into the inlet conduit 102 upstream of the SCR catalyst 150. In such embodiments, mixers, baffles, vanes or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., $NO_x$ gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In some embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR catalyst 150 or upstream thereof (e.g., into the inlet conduit 102) or a mixer (not shown) positioned upstream of the SCR catalyst 150. The reductant insertion assembly 120 may comprise various structures to facilitate receipt of the reductant from the reductant storage tank 110 and delivery to the SCR catalyst 150, for example, pumps, valves, screens, filters, etc.

The aftertreatment system 100 may also comprise a reductant injector fluidly coupled to the reductant insertion assembly 120 and configured to insert the reductant (e.g., a combined flow of reductant and compressed air) into the SCR catalyst 150. In various embodiments, the reductant injector may comprise a nozzle having predetermined diameter. In various embodiments, the reductant injector may be positioned in the reductant port 156 and structured to deliver a stream or a jet of the reductant into the internal volume of the housing 101 so as to deliver the reductant to the SCR catalyst 150.

The hybrid vehicle 1 may also include an ambient temperature sensor 107 configured to measure an ambient temperature of an environment external to the aftertreatment system. The vehicle 1 may also include a vehicle speed sensor 109 configured to determine a speed of the hybrid vehicle 1.

The controller 170 is operatively coupled to the engine 10, the energy storage device 20, the ambient temperature sensor 107, the vehicle speed sensor 109, and the aftertreatment system 100, for example, the SCR catalyst inlet temperature sensor 153, and the SCR catalyst outlet temperature sensor 155. The controller 170 may be communicatively coupled to the first sensor 103 and may be configured to receive a first sensor signal from the first sensor 103, for example, to determine an amount of $NO_x$ gases included in the exhaust gas entering the aftertreatment system. The controller 170 may also be communicatively coupled to the second sensor 105 and may be configured to determine a concentration of $NO_x$ gases or ammonia included in the exhaust gas being expelled into the environment. The controller 170 may be operably coupled to the engine 10, the energy storage device 20, the ambient temperature sensor 107, and various components of the aftertreatment system 100 using any type and any number of wired or wireless connections. For example, a wired connection may include a serial cable, a fiber optic cable, a CATS cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 may be configured to estimate an exhaust gas temperature and an exhaust gas flow rate of the exhaust gas based on a set of engine operation parameters. For example, the controller 170 may receive an engine operating parameter signal from the engine 10 indicative of the engine operating parameters. The controller 170 interprets the engine operating parameter signal and determines the exhaust gas temperature and flow rate therefrom, for example, using equations, algorithms, or lookup tables provided in the controller 170. The set of engine operating parameters may include but are not limited to an engine speed of the engine 10, and a load demand (e.g., torque demand) from the engine 10, and a coolant temperature of a coolant of the engine 10. The load demand may be determined based on a position of a throttle of the hybrid vehicle 1. In some embodiments, the controller 170 may determine the exhaust gas temperature and flow rates also based on a torque demand from the energy storage device 20.

The controller 170 is configured to estimate an exhaust gas cooling rate of the SCR catalyst 150 based on the estimated exhaust gas temperature, the exhaust gas flow rate and a SCR catalyst temperature. For example, the controller 170 may receive SCR inlet temperature and SCR outlet temperature signals from the SCR catalyst inlet temperature sensor 153 and the SCR catalyst outlet temperature sensor 155, and estimate the SCR catalyst temperature therefrom. The controller 170 may include equations, algorithms, and/or lookup tables to determine the exhaust gas cooling rate based on the exhaust gas temperature and flow rate, and the SCR catalyst temperature. In some embodiments, the controller 170 may be configured to determine the exhaust gas cooling rate based also on an oxidation catalyst temperature of the oxidation catalyst 130 and/or a filter temperature of the filter 140. The exhaust gas cooling rate indicates the rate at which the exhaust gas and thereby, the SCR catalyst 150 is cooling, for example, due to a low load on the engine 10, or the hybrid vehicle 1 being powered solely by the energy storage device 20. In some embodiments, the exhaust gas cooling rate may be determined during operation of the hybrid vehicle 1 solely on the engine 10.

The controller 170 is also configured to determine an ambient cooling rate of the SCR catalyst 150 based on the ambient temperature, a vehicle speed of the hybrid vehicle 1, and the SCR catalyst temperature. For example, the temperature of the ambient environment and how fast the hybrid vehicle 1 is travelling, which dictates how fast air is blowing over the aftertreatment system 100, is also a contributing factor in determining the ambient cooling rate of the SCR catalyst 150, i.e., air cooling of the SCR catalyst 150. In some embodiments, the ambient cooling rate may be determined during operation of the hybrid vehicle 1 solely on the energy storage device 20.

The controller 170 is configured to determine a SCR catalyst temperature change rate based on the exhaust gas cooling rate and the ambient cooling rate. SCR catalyst temperature change rate indicates how fast the SCR catalyst temperature is increasing or decreasing. This may be used to predict how fast the SCR catalyst temperature will decrease below a low temperature threshold (e.g., 200 degrees Celsius), or increase above a high temperature threshold (e.g., 400 degrees Celsius).

The controller 170 is configured to adjust a load distribution between the engine 10 and the energy storage device 20 based on the SCR catalyst temperature change rate. For example, the controller 170 may use the SCR catalyst temperature change rate to determine if the SCR catalyst temperature is decreasing towards the low temperature threshold (e.g., is 10 degrees Celsius greater than the low temperature threshold) at which the catalytic conversion efficiency of the SCR catalyst 150 falls below a minimum allowable catalytic conversion efficiency of the SCR catalyst 150 (e.g., 90% catalytic conversion efficiency). In response to determining based on the SCR catalyst temperature change rate that the SCR catalyst is approaching the low temperature threshold, the controller 170 may be configured to adjust the load distribution to increase load on the engine 10. For example, in response to determining that the temperature of the SCR catalyst 150 will reach the low temperature threshold in a time period equal to or less than 0.1 minutes to 3 minutes, the controller 170 may increase the percentage of load (e.g., torque %) drawn from the engine 10 relative to the energy storage device 20. The increased load on the engine 10 increases the amount of fuel consumed by the engine 10 and results in increase of a temperature of the exhaust gas and thus the SCR catalyst 150.

Moreover, in response to determining based on the SCR catalyst temperature change rate that the SCR catalyst temperature is increasing towards the high temperature threshold (e.g., 400 degrees Celsius), the controller 170 is configured to adjust the load distribution to decrease load on the engine 10. For example, the high temperature threshold may correspond to a temperature at which the SCR catalyst 150 experiences release of stored ammonia and also experience a decrease in catalytic conversion efficiency thereof and/or release of stored ammonia leading to ammonia slip. In response to determining based on the SCR catalyst temperature change rate that the SCR catalyst temperature is approaching the high temperature threshold, the controller 170 may be configured to adjust the load distribution to decrease load on the engine 10. For example, in response to determining that the temperature of the SCR catalyst 150 will reach the high temperature threshold in a time period equal to or less than 1 minutes, the controller 170 may decrease the percentage of power (e.g., torque %) drawn from the engine 10 relative to the energy storage device 20. The decrease load on the engine 10 decreases fuel consumption and results in decrease of a temperature of the exhaust gas and thus the SCR catalyst 150.

Furthermore, the controller 170 may be configured to inhibit excessive temperature ramps of the SCR catalyst 150. For example, when transitioning from a light load to a mid/high load on the engine 10, the SCR catalyst 150 may experience a significant increase in temperature causing the SCR catalyst 150 to release stored ammonia, which can lead to ammonia slip. In some embodiments, in response to determining that an increase in the SCR catalyst temperature change rate (e.g., based on a throttle command of the vehicle 1 and/or temperature changes in upstream components such as the oxidation catalyst 130 and/or the filter 140) is greater than a rate increase threshold (e.g., greater than 50 degrees Celsius/minute to 200 degrees Celsius/minute), the controller 170 may be configured to increase a load on the energy storage device 20 relative to the engine 10 so as to reduce the SCR catalyst temperature change rate. Such situations may occur when the hybrid vehicle 1 transitions from a light load to a mid or high load. In some embodiments, the controller 170 is configured to increase the load on the engine 10 at SCR catalyst 150 inlet temperatures below 300 degrees Celsius when the downstream AMOK catalyst 160 is at a sufficient lightoff temperature.

The controller 170 inhibits a sharp increase in the SCR catalyst temperature, thereby reducing thermal stress and damage to the SCR catalyst 150. In some embodiments, the controller 170 may also instruct the reductant insertion assembly 120 to adjust an amount of reductant inserted into the aftertreatment system 100 based on the SCR catalyst temperature change rate, for example, to allow ammonia stored in the SCR catalyst 150 to be depleted prior to desorbing due to SCR catalyst temperature increase. In some embodiments, in addition to temperature management, the controller 170 may be configured to increase a load on the engine 10 or adjust an air/fuel ratio to the engine 10 for increase an amount of NO gases in the exhaust gas emitted by the engine 10. The increased NO in the exhaust gas consumes the ammonia released from the SCR catalyst 150 at high temperatures, thereby reducing ammonia slip.

In some embodiments, in response to determining that the SCR catalyst temperature is within an optimal operational range (e.g., between 200 degrees Celsius and 400 degrees Celsius), the controller 170 may be configured to adjust the load distribution based on a load demand, a desired fuel economy, an amount of fuel remaining, and/or an amount of power remaining in the energy storage device 20. This may correspond to a normal operation of the aftertreatment system. In such instances, the controller 170 may adjust the percentage of load drawn from the engine 10 relative to the energy storage device 20 so as to maximize fuel economy.

In some embodiments, the controller 170 may also be configured to adjust a load distribution between the engine 10 and the energy storage device 20 based on the load demand from the hybrid vehicle, a location of the hybrid vehicle 1 on the route, and/or or a speed of the hybrid vehicle 1. For example, when there is low load on the hybrid vehicle 1, or the hybrid vehicle 1 is at a port near a dock, or a speed of the hybrid vehicle 1 (e.g., determined by the vehicle speed sensor 109) is below a low threshold (e.g., less than 40 mph), the controller 10 may be configured to operate the hybrid vehicle 1 using solely energy storage device 20. Because a significant amount of $NO_x$ is generated at low load conditions or low speed (e.g., greater than 50% $NO_x$ emissions under low load at port near dock or creeping or idling in queue at dock), operating the hybrid vehicle 1 solely on the energy storage device 20 eliminates the main portion of the $NO_x$ emissions by the hybrid vehicle. However, in some instances, the controller 170 may be configured to start the engine 10 during such operational conditions, for example, in response to a power stored in the energy storage device 20 dropping below a threshold, or based on the SCR catalyst temperature change rate, as previously described herein. In some embodiments, SCR catalyst 150 may be heated, for example, using an electrical heater (not shown) to maintain the temperature of the SCR catalyst 150 above the low temperature threshold during such conditions, or using any other suitable cold start technologies.

The controller 170 may be configured to balance load between engine 10 and the energy storage device 20, when travelling under high load conditions, or when travelling at medium speeds (e.g., between 40-55 mph) where power from the engine 10 may be desirable. Such situations may arise when the hybrid vehicle 1 is travelling on the local highway or mounting a ramp of a metro highway. Utilizing the engine 10 increases temperature of the exhaust gas, thereby heating the SCR catalyst 150 increasing its catalytic conversion efficiency, and charge the energy storage device. The controller 170 may also be configured to operate the hybrid vehicle 1 at high speeds (e.g., greater than 55 mph), for example, while travelling on a metro highway. The energy storage device 20 may be charged, for example, for use during future high load conditions. Fuel economy of the engine 10 is higher at high speeds, while sufficient power is provided to the hybrid vehicle 1 to maintain the high speed. Furthermore, the SCR catalyst 150 is at a sufficient temperature to reduce $NO_x$ emissions at a high catalytic conversion efficiency. In some embodiments, the controller 170 may also be configured to increase or decrease a load on the engine 10 so as to control an amount of $NO_x$ gases in the exhaust gas emitted by the engine 10, for example, to obtain a desired SCR catalytic conversion efficiency.

Figure 2:
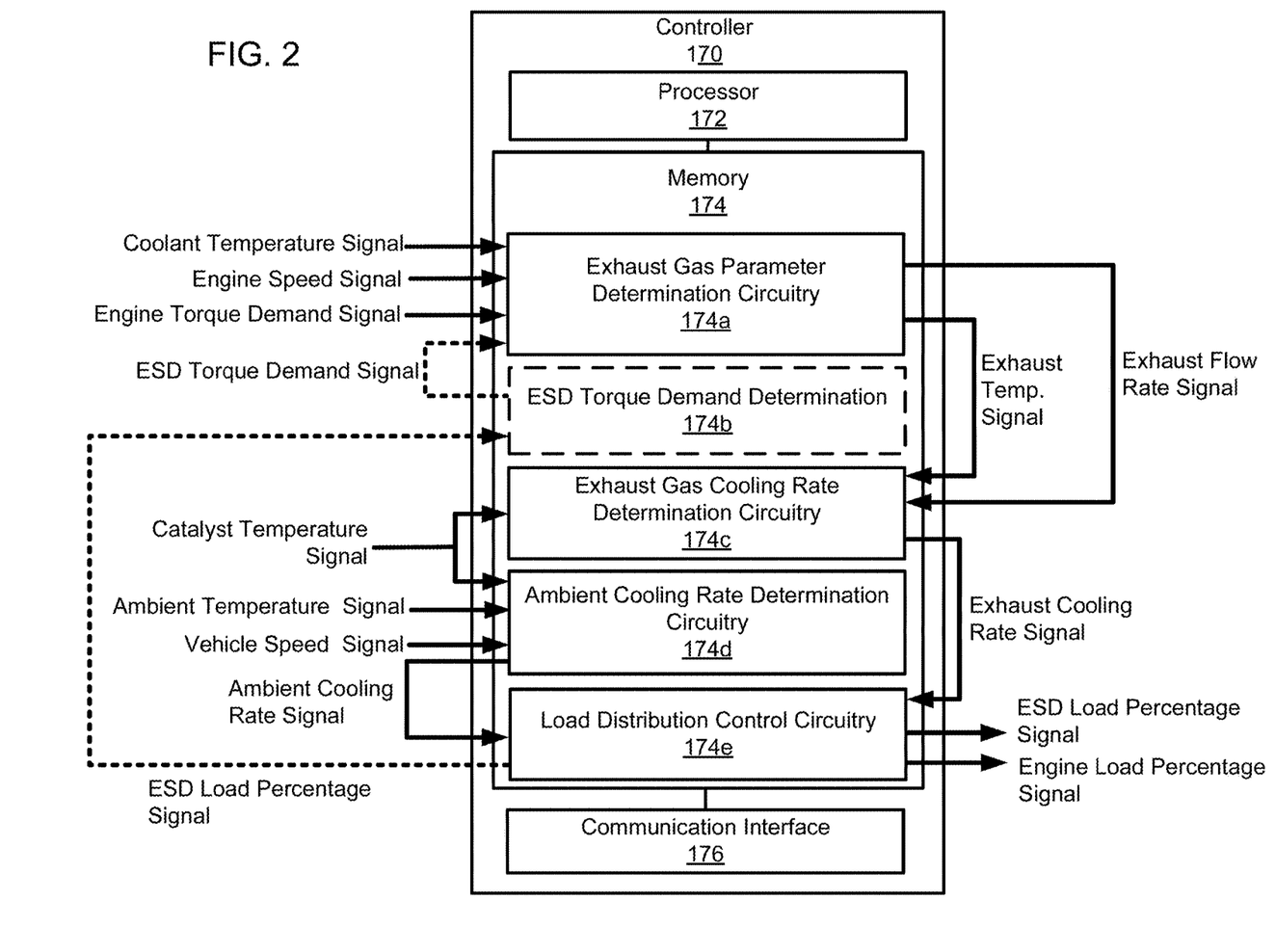
FIG. 2 is a schematic block diagram of a controller that may be included in the hybrid vehicle of FIG. 1, according to an embodiment.

In some embodiments, the controller 170 may include various components and modules configured to perform the operations of the controller 170. For example, FIG. 2 is a schematic block diagram of the controller 170, according to an embodiment. The controller 170 may include a processor 172, a memory 174, or any other computer readable medium, and a communication interface 176. Furthermore, the controller 170 includes an exhaust gas parameter determination circuitry 174a, an exhaust gas cooling rate determination circuitry 174c, an ambient cooling rate determination circuitry 174d, a load distribution control circuitry 174e, and in some embodiments, an energy storage device (ESD) torque demand determination circuitry 174b. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e are embodied as hardware units, such as electronic control units. As such, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e may be embodied as one or more circuitry components including, but not limited to, processing circuitry, network interfaces, peripheral devices, input devices, output devices, sensors, etc.

In some embodiments, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e may also include programmable hardware devices such as field programmable gate arrays, programmable array logic, programmable logic devices or the like. In this regard, the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e may include one or more memory devices for storing instructions that are executable by the processor(s) of the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e. Thus, the depicted configuration represents the aforementioned arrangement the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e are embodied as machine or computer-readable media. However, as mentioned above, this illustration is not meant to be limiting as the present disclosure contemplates other embodiments such as the aforementioned embodiment where the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e, or at least one circuit of the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the exhaust gas parameter determination circuitry 174a, the ESD torque demand determination circuitry 174b, the exhaust gas cooling rate determination circuitry 174c, the ambient cooling rate determination circuitry 174d, and the load distribution control circuitry 174e) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the engine 10, the energy storage device 20, the first sensor 103, the second sensor 105, the ambient temperature sensor 107, the vehicle speed sensor 109, the temperature sensors 153 and 155. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The exhaust gas parameter determination circuitry 174a is configured to receive a set of engine operating parameter signals from the engine 10, and determine an exhaust gas temperature and exhaust gas flow rate therefrom. For example, the exhaust gas parameter determination circuitry may receive an engine torque demand signal (e.g., from a throttle of the hybrid vehicle 1), an engine speed signal, and in some embodiments, a coolant temperature signal from the engine 10 and determine the exhaust gas temperature and flow rate therefrom. In some embodiments, the exhaust gas parameter determination circuitry 174a may also receive an ESD torque demand signal from the ESD torque demand determination circuitry 174b to determine a total torque demanded by hybrid vehicle 1, and use the total torque demand for determining the exhaust gas temperature and flow rate.

The ESD torque demand determination circuitry 174b receives an ESD load percentage signal from the load distribution control circuitry 174e which is indicative of the percentage of load (e.g., torque) being provided by the energy storage device 20 for providing the hybrid vehicle 1. The ESD torque demand determination circuitry 174b determines the torque demand of the ESD and communicates the ESD torque demand signal to the exhaust gas parameter determination circuitry 174a, as previously described herein.

The exhaust gas cooling rate determination circuitry 174c receives an exhaust gas temperature signal and an exhaust gas flow rate signal from the exhaust gas parameter determination circuitry 174a. The exhaust gas cooling rate determination circuitry 174c also receives a SCR catalyst temperature signal (e.g., from the SCR catalyst inlet and outlet temperature sensors 153 and 155) and determines the exhaust gas cooling rate of the SCR catalyst 150 based on the exhaust gas temperature, the exhaust gas flow rate, and the SCR catalyst temperature. In some embodiments, the exhaust gas cooling rate determination circuitry 174c may be configured to determine the exhaust gas cooling rate based also on an oxidation catalyst temperature of the oxidation catalyst 130 and/or a filter temperature of the filter 140.

The ambient cooling rate determination circuitry 174d is configured to determine the ambient cooling rate of the SCR catalyst 150. For example, the ambient cooling rate determination circuitry 174d receives the SCR catalyst temperature signal, an ambient temperature signal indicative of the ambient temperature from the ambient temperature sensor 107, and a vehicle speed signal from the vehicle speed sensor 109, and determines the ambient cooling rate therefrom.

The load distribution control circuitry 174e receives an exhaust gas cooling rate from the exhaust gas cooling rate determination circuitry 174c and an ambient cooling rate signal from the ambient cooling rate determination circuitry 174d, and determines the SCR catalyst temperature change rate therefrom. Based on the SCR catalyst temperature change rate, the load distribution control circuitry 174e generates an ESD load percentage signal communicated to the energy storage device 20 (or an electromagnetic device coupled to the energy storage device 20), and an engine load percentage signal communicated to the engine 10. The respective load percentage signals adjust a load distribution between the engine 10 and the energy storage device 20 so as to suppress reduction in the SCR catalyst temperature below the low temperature threshold, increase in the SCR catalyst temperature above the high threshold temperature, and/or suppressing sharping increase in the SCR catalyst temperature change rate.

Figure 3A:
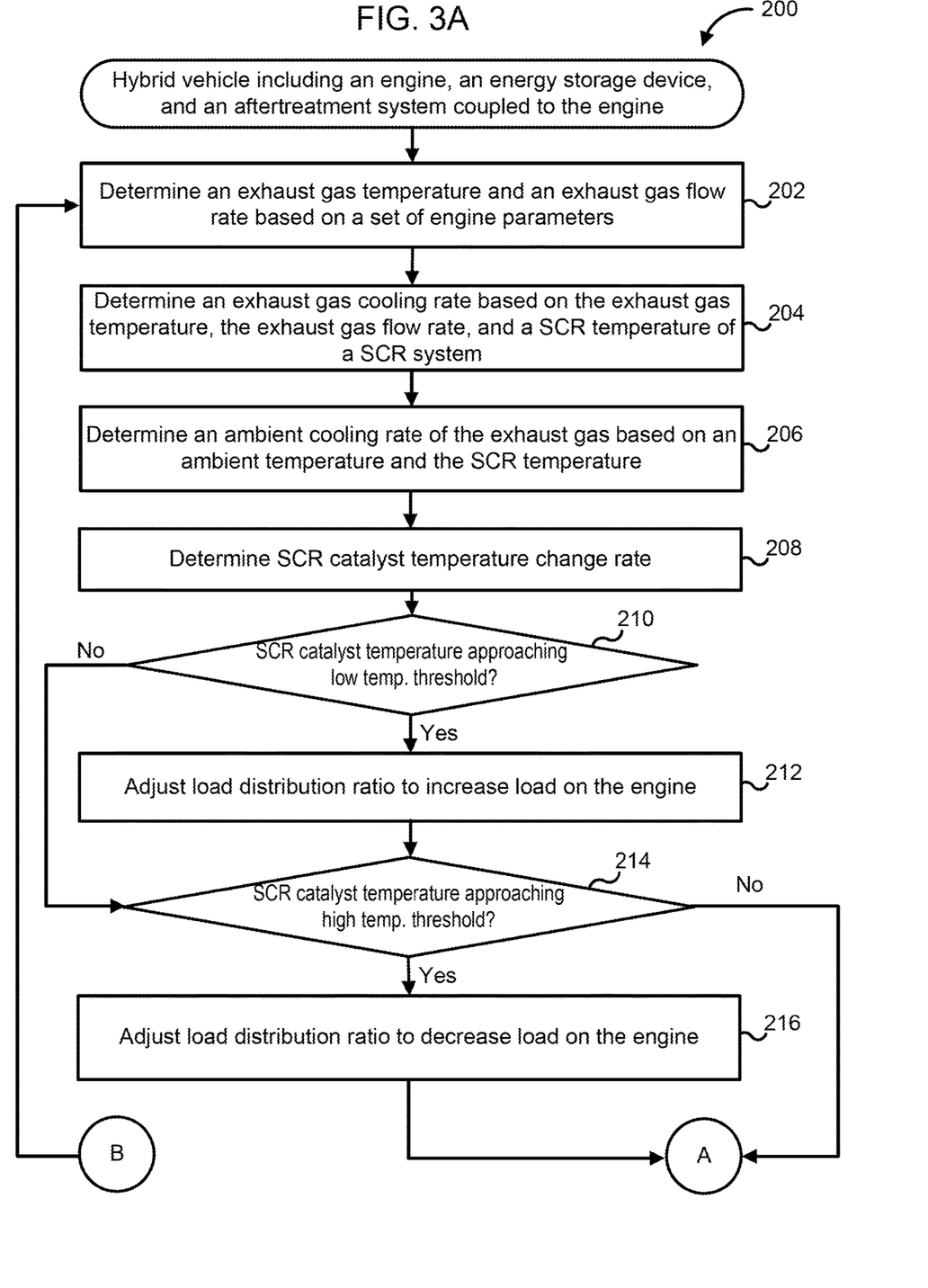
FIGS. 3A-3B are a schematic flow diagram of a method for controlling operation of a hybrid vehicle, according to an embodiment.
Figure 3B:
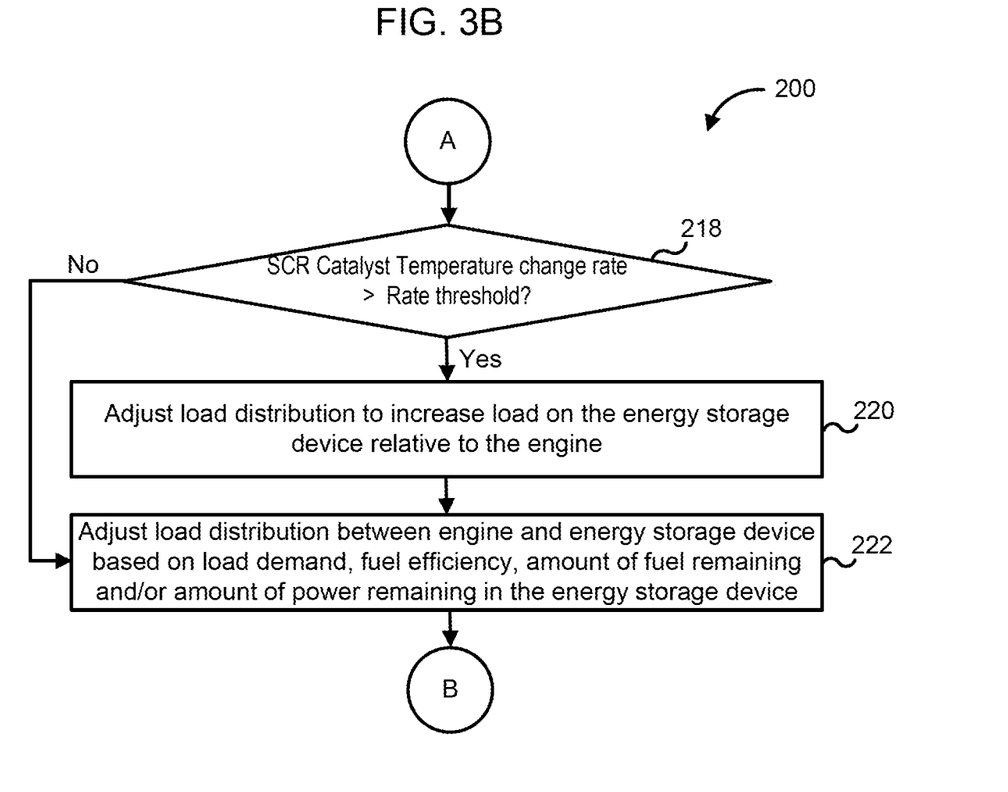

FIGS. 3A-3B illustrate a schematic flow diagram of an example method 200 for controlling operation of a hybrid vehicle, according to an embodiment. The hybrid vehicle (e.g., the hybrid vehicle 1) includes an engine (e.g., the engine 10), an energy storage device (e.g., the energy storage device 20), and an aftertreatment system (e.g., the aftertreatment system 100). The hybrid vehicle may include a controller (e.g., the controller 170) configured to adjust a load distribution between the engine and the energy storage device of to allow a SCR catalyst (e.g., the SCR catalyst 150) included in the aftertreatment system to operate at an optimal catalytic conversion efficiency. While described with respect to the vehicle 1 and the controller 170, the operations of the method 200 may be performed with any other suitable controller or employed in any other hybrid vehicle.

The method 200 includes determining, by the controller 170, an exhaust gas temperature and an exhaust gas flow rate of an exhaust gas flowing through the SCR catalyst 150 based on a set of engine operation parameters, at 202. The set of the engine operating parameters may be include, for example, load or torque demand from the engine 10, engine speed, and in some embodiments, a coolant temperature of a coolant of the engine 10).

At 204, the controller 170 determines an exhaust gas cooling rate of the SCR catalyst based on the determined exhaust gas temperature, the exhaust gas flow rate, and a SCR catalyst 150. The exhaust gas cooling rate indicates the rate at which the exhaust gas and thereby, the SCR catalyst 150 is cooling, for example, due to a low load on the engine 10, or the hybrid vehicle 1 being powered solely by the energy storage device 20.

At 206, the controller 170 determines an ambient cooling rate of the SCR catalyst 150 based on an ambient temperature (e.g., measured by the ambient temperature sensor 107), a vehicle speed (e.g., determined by the vehicle speed sensor 109), and the SCR catalyst temperature.

At 208, the controller 170 determines a SCR catalyst temperature change rate of the SCR catalyst 150 based on the exhaust gas cooling rate and the ambient cooling rate.

At 210, the controller 170 determines if the SCR catalyst temperature is approaching a low temperature threshold (e.g., 200 degrees Celsius) based on the SCR catalyst temperature change rate. In response to determining that the SCR catalyst temperature is approaching the low temperature threshold (210:YES), the controller 170 adjusts a load distribution between the engine 10 and the energy storage device 20 to increase a load on the engine 10, at 212. This increases the exhaust gas temperature, thereby heating the SCR catalyst 150, as previously described herein.

In response to determining that the SCR catalyst temperature is not approaching the low temperature threshold (210: NO), the method 200 proceeds to operation 214, and the controller 170 determines whether the SCR catalyst is approaching a high temperature threshold based on the SCR catalyst temperature change rate. In response to determining that the SCR catalyst temperature is approaching the high temperature threshold (214:YES), the controller 170 adjusts a load distribution to decrease a load on the engine 10, at 216, for example, by increasing a load on the energy storage device 20.

In response to determining that the SCR catalyst temperature is not approaching the high temperature threshold (214:NO), the method 200 proceeds to operation 218, and the controller 170 determines if the SCR catalyst temperature change rate is greater than a rate threshold (e.g., greater than 50 degrees Celsius per minute to 200 degrees Celsius/minute). In response to determining that the SCR catalyst temperature change rate is greater than the rate threshold (218:YES), the controller 170 adjusts the load distribution to increase a load on the energy storage device 20 relative to the engine 10, at 220.

In some embodiments, in response to determining that the SCR catalyst temperature is within an optimal operational range (e.g., between 250 degrees Celsius and 550 degrees Celsius), the controller 170 may be configured to adjust the load distribution based on a load demand, a desired fuel economy, an amount of fuel remaining, and/or an amount of power remaining in the energy storage device 20, at 222. This may correspond to an operation of the aftertreatment system at its optimal catalytic conversion efficiency (e.g., greater than 90% efficiency). In such instances, the controller 170 may adjust the percentage of load drawn from the engine 10 relative to the energy storage device 20 so as maximize fuel economy.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller for controlling an operation of a hybrid vehicle that includes an engine, an aftertreatment system comprising a selective catalytic reduction (SCR) catalyst coupled to the engine, and an energy storage device, the controller being configured to be operatively coupled to the engine, the energy storage device, and the aftertreatment system, the controller configured to:
   estimate an exhaust gas temperature and an exhaust gas flow rate of an exhaust gas received by the aftertreatment system from the engine based on a set of engine operating parameters;
   estimate an exhaust gas cooling rate of the SCR catalyst based on the estimated exhaust gas temperature and the exhaust gas flow rate, and a SCR catalyst temperature;
   determine an ambient cooling rate of the SCR catalyst based on an ambient temperature of an environment external to the aftertreatment system, a vehicle speed of the hybrid vehicle, and the SCR catalyst temperature;
   estimate a SCR catalyst temperature change rate based on the exhaust gas cooling rate and the ambient cooling rate, wherein the SCR catalyst temperature change rate is a change in the SCR catalyst temperature over time; and
   adjust a load distribution between the engine and the energy storage device based on the SCR catalyst temperature change rate.

2. The controller of claim 1, further configured to:
   in response to determining based on the SCR catalyst temperature change rate that the SCR catalyst temperature is greater than a low temperature threshold and is decreasing, adjust the load distribution so as to increase a load on the engine.

3. The controller of claim 1, further configured to:
   in response to determining based on the SCR catalyst temperature change rate that the SCR catalyst temperature is less than a high temperature threshold and is increasing, adjust the load distribution so as to decrease load on the engine.

4. The controller of claim 1, further configured to:
   in response to determining that an increase in the SCR catalyst temperature change rate is greater than a rate increase threshold, increase a load on the energy storage device relative to the engine so as to reduce the SCR catalyst temperature change rate.

5. The controller of claim 1, wherein the set of engine operating parameters comprise a speed of the engine, a torque demand from the engine, and a coolant temperature of a coolant flowing through the engine.

6. The controller of claim 1, wherein:
   the aftertreatment system also comprises an oxidation catalyst disposed upstream of the SCR catalyst; and
   the controller is configured to estimate the exhaust gas cooling rate based also on an oxidation catalyst temperature of the oxidation catalyst.

7. The controller of claim 1, further configured to:
   instruct a reductant insertion assembly to adjust an amount of reductant inserted into the aftertreatment system.

8. The controller of claim 1, further configured to:
   in response to determining that the SCR catalyst temperature is within an optimal operational range, adjust the load distribution based on a load demand, a desired fuel economy, an amount of fuel remaining, and/or an amount of power remaining in the energy storage device.

9. A hybrid vehicle, comprising:
   an engine;
   an energy storage device;
   an aftertreatment system fluidly coupled to the engine and configured to receive an exhaust gas generated by the engine, the aftertreatment system comprising a selective catalytic reduction (SCR) catalyst configured to treat constituents of the exhaust gas; and
   a controller operatively coupled to the engine, the energy storage device, and the aftertreatment system, the controller configured to:
      estimate an exhaust gas temperature and an exhaust gas flow rate of the exhaust gas based on a set of engine operating parameters,
      estimate an exhaust gas cooling rate of the SCR catalyst based on the estimated exhaust gas temperature and the exhaust gas flow rate, and a SCR catalyst temperature,
      determine an ambient cooling rate of the SCR catalyst based on an ambient temperature of an environment external to the aftertreatment system, a vehicle speed of the hybrid vehicle, and the SCR catalyst temperature,
      estimate a SCR catalyst temperature change rate based on the exhaust gas cooling rate and the ambient cooling rate, wherein the SCR catalyst temperature change rate is a change in the SCR catalyst temperature over time, and
      adjust a load distribution between the engine and the energy storage device based on the SCR catalyst temperature change rate.

10. The hybrid vehicle of claim 9, wherein the controller is configured to:
    in response to determining based on the SCR catalyst temperature change rate that the SCR catalyst temperature is greater than a low temperature threshold and is decreasing, adjust the load distribution so as to increase a load on the engine.

11. The hybrid vehicle of claim 9, wherein the controller is configured to:
    in response to determining based on the SCR catalyst temperature change rate that the SCR catalyst temperature is less than a high temperature threshold and is increasing, adjust the load distribution so as to decrease load on the engine.

12. The hybrid vehicle of claim 9, wherein the controller is configured to:
    in response to determining that an increase in the SCR catalyst temperature change rate is greater than a rate increase threshold, increase a load on the energy storage device relative to the engine so as to reduce the SCR catalyst temperature change rate.

13. The hybrid vehicle of claim 9, wherein the set of engine operating parameters comprise a speed of the engine, a torque demand from the engine, and a coolant temperature of a coolant flowing through the engine.

14. The hybrid vehicle of claim 9, wherein:
    the aftertreatment system also comprises an oxidation catalyst disposed upstream of the SCR catalyst; and
    the controller is configured to estimate the exhaust gas cooling rate based also on an oxidation catalyst temperature of the oxidation catalyst.

15. The hybrid vehicle of claim 6, wherein:
the aftertreatment system includes a reductant insertion assembly configured to insert a reductant into the aftertreatment system; and
the controller is further configured to:
instruct the reductant insertion assembly to adjust an amount of reductant inserted into the aftertreatment system.

16. The hybrid vehicle of claim 9, wherein the controller is further configured to:
in response to determining that the SCR catalyst temperature is within an optimal operational range, adjust the load distribution based on a load demand, a desired fuel economy, an amount of fuel remaining, and/or an amount of power remaining in the energy storage device.

17. A method for controlling operation of a hybrid vehicle that includes an engine, an aftertreatment system comprising a selective catalytic reduction (SCR) catalyst coupled to the engine, and an energy storage device, the method comprising:
estimating, by a controller of the hybrid vehicle, an exhaust gas temperature and an exhaust gas flow rate of an exhaust gas received by the aftertreatment system from the engine based on a set of engine operating parameters;
estimating, by the controller, an exhaust gas cooling rate of the SCR catalyst based on the estimated exhaust gas temperature, the exhaust gas flow rate, and a SCR catalyst temperature;
determining, by the controller, an ambient cooling rate of the SCR catalyst based on an ambient temperature of an environment external to the aftertreatment system, a vehicle speed of the hybrid vehicle, and the SCR catalyst temperature;
estimating, by the controller, a SCR catalyst temperature change rate based on the exhaust gas cooling rate and the ambient cooling rate, wherein the SCR catalyst temperature change rate is a change in the SCR catalyst temperature over time; and
adjusting, by the controller, a load distribution between the engine and the energy storage device based on the SCR catalyst temperature change rate.

18. The method of claim 17, further comprising:
in response to determining, by the controller, based on the SCR catalyst temperature change rate that the SCR catalyst temperature is greater than a low temperature threshold and is decreasing, adjusting, by the controller, the load distribution so as to increase a load on the engine.

19. The method of claim 17, further comprising:
in response to determining, by the controller, based on the SCR catalyst temperature change rate that the SCR catalyst temperature is less than a high temperature threshold and is increasing, adjusting, by the controller, the load distribution so as to decrease load on the engine.

20. A controller for controlling an operation of a hybrid vehicle that includes an engine, an aftertreatment system comprising a selective catalytic reduction (SCR) catalyst coupled to the engine, and an energy storage device, the controller being configured to be operatively coupled to the engine, the energy storage device, and the aftertreatment system, the controller configured to:
estimate an exhaust gas cooling rate of the SCR catalyst;
determine or estimate an ambient cooling rate of the SCR catalyst;
estimate a SCR catalyst temperature change rate based on the exhaust gas cooling rate and the ambient cooling rate, wherein the SCR catalyst temperature change rate is a change in the SCR catalyst temperature over time; and
adjust a load distribution between the engine and the energy storage device based on the SCR catalyst temperature change rate.

* * * * *